(No Model.) 2 Sheets—Sheet 1.

A. RUSHFORTH.
AUTOMATIC COUPLING FOR RAILWAY WAGONS, &c.

No. 592,210. Patented Oct. 19, 1897.

(No Model.) 2 Sheets—Sheet 2.

A. RUSHFORTH.
AUTOMATIC COUPLING FOR RAILWAY WAGONS, &c.

No. 592,210. Patented Oct. 19, 1897.

UNITED STATES PATENT OFFICE.

ARTHUR RUSHFORTH, OF BRADFORD, ENGLAND.

AUTOMATIC COUPLING FOR RAILWAY-WAGONS, &c.

SPECIFICATION forming part of Letters Patent No. 592,210, dated October 19, 1897.

Application filed October 3, 1896. Serial No. 607,753. (No model.)

*To all whom it may concern:*

Be it known that I, ARTHUR RUSHFORTH, a subject of the Queen of Great Britain and Ireland, residing at Bradford, in the county of York, England, have invented certain Improvements in Automatic Couplings for Railway-Wagons and Like Vehicles, of which the following is a specification.

This invention relates to certain improvements in the apparatus for coupling railway-wagons and like vehicles, and has for its object the automatic coupling of such vehicles upon the same coming in contact with each other, without the necessity of an attendant passing between or underneath the wagons, as is the case with couplings of the ordinary description, thereby minimizing the danger of accident and effecting a saving of labor.

In order that my invention may be fully understood, I will describe the same in detail by making reference to the accompanying sheets of drawings, in which—

Figure 1:
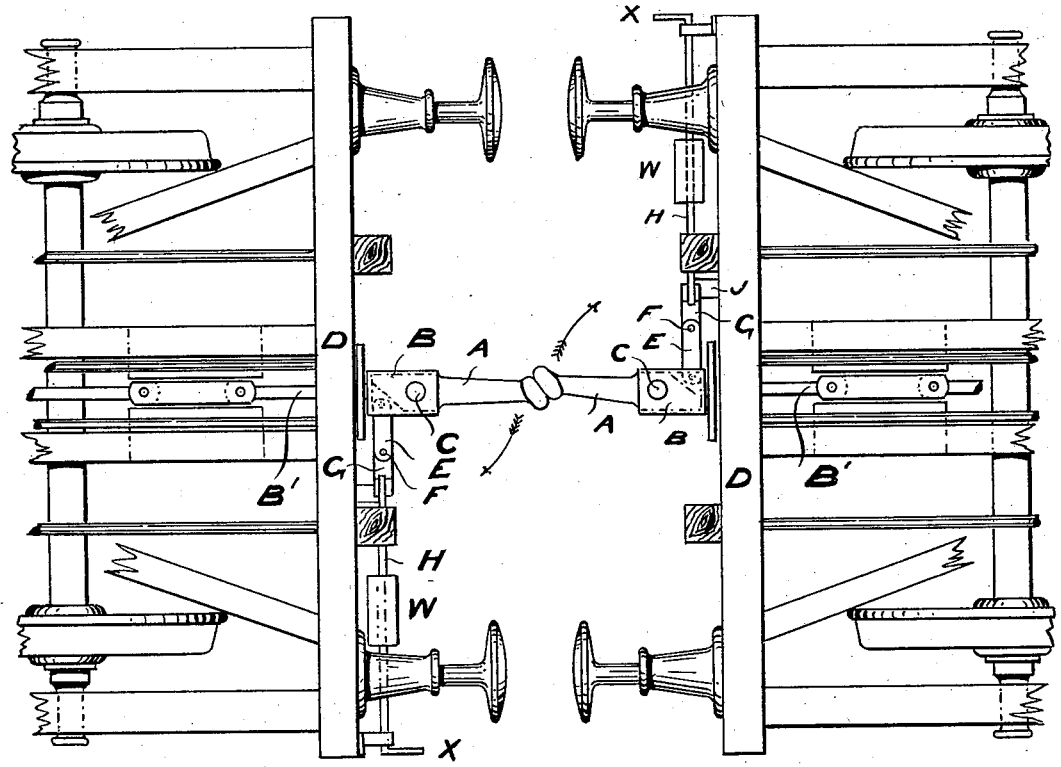
Figure 2:
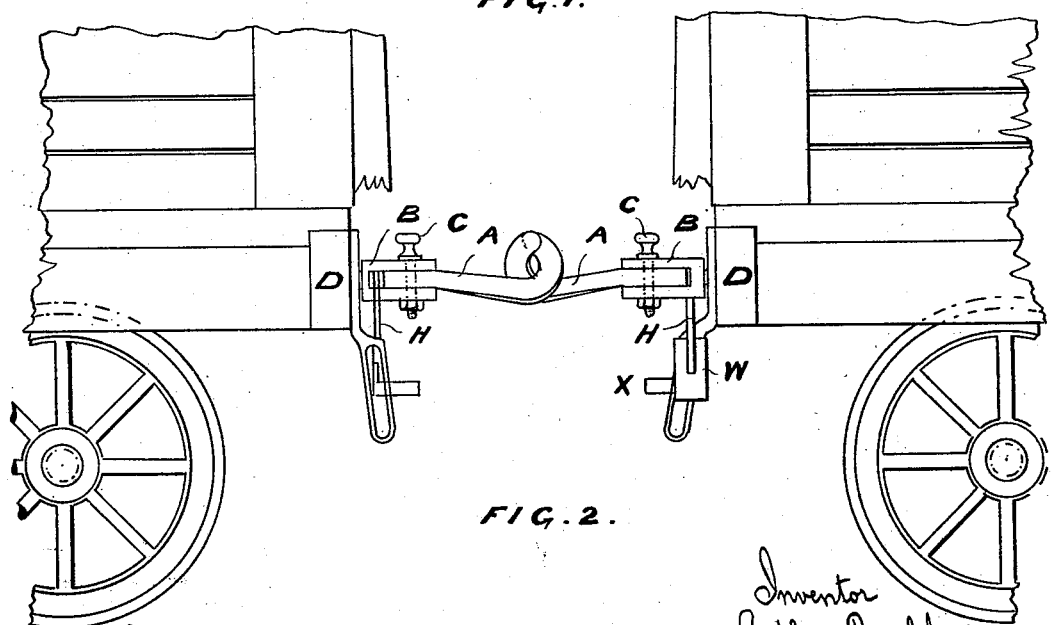
Figure 3:
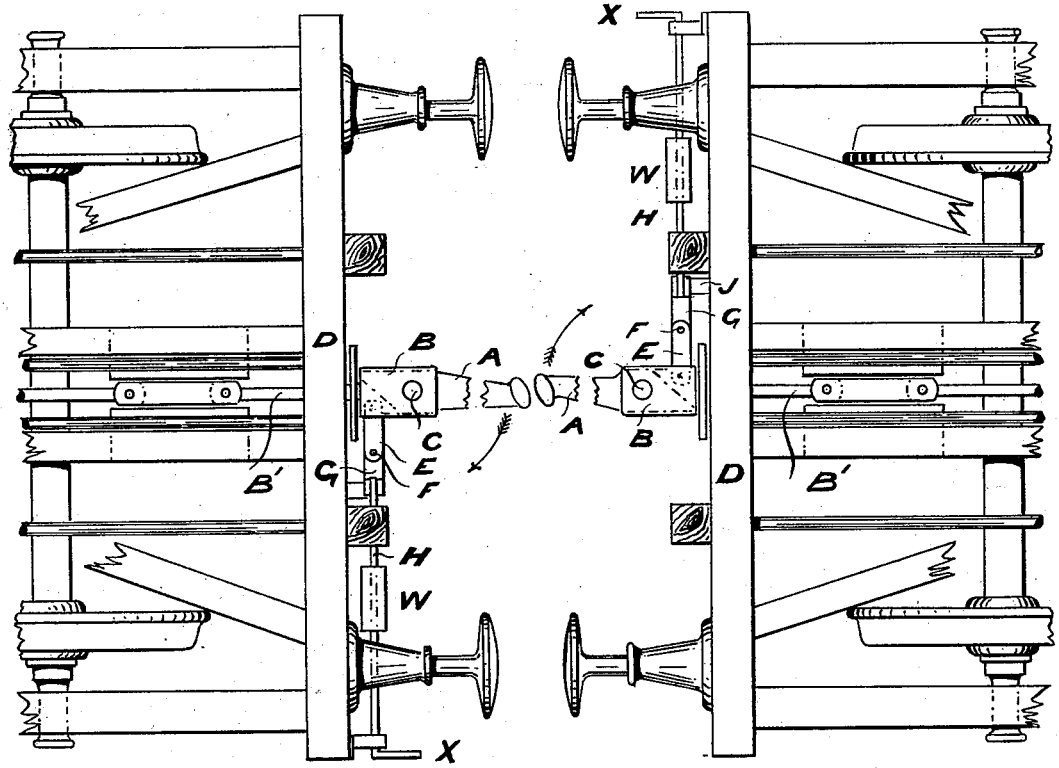
Figure 4:
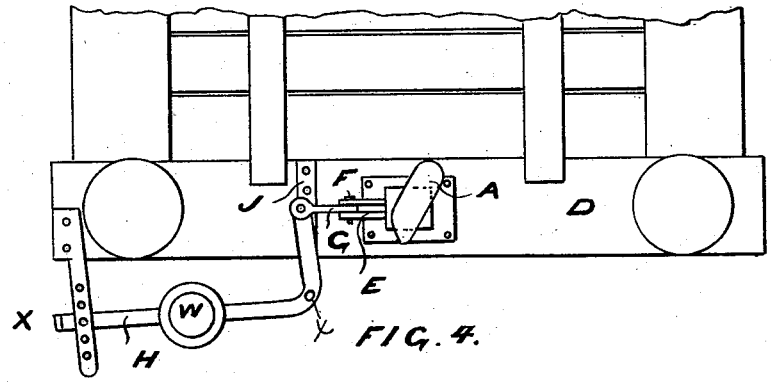
Figure 5:
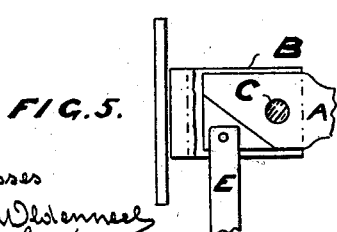
Figure 6:
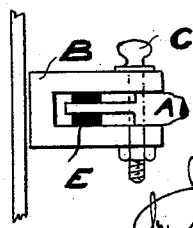

Figure 1 represents a plan view of portions of two railway-wagons with my improved coupling applied thereto, the two wagons being in a coupled position. Fig. 2 is an elevation of same with a portion of head-posts and buffers removed for purpose of better illustration. Fig. 3 is a plan view showing the two wagons uncoupled. Fig. 4 is an end view of a wagon with my improvement attached, and Figs. 5 and 6 are enlarged details.

The wagon or the like is of the ordinary description, and my invention to be mounted thereto requires no alteration to the vehicle whatever.

The draw-bar hook A is mounted in a jaw B by means of a fulcrum-pin C. The extension-rod B' of jaw B passes through the head-stock D and is connected to what is known as the "spring-buckle" in exactly the same manner as the ordinary draw-bar hook at present in use. To the draw-bar hook A, I mount a link or the like E, connected by a pin at F to one end of a rod G. The opposite end of the said rod is connected to a bell-crank lever H, pivoted at $x$ on a bracket J, secured to the head-stock D. The said bell-crank lever H is provided with a counterbalance-weight W. The ends of the said draw-bar hooks A are formed at an angle, so that they slide past each other upon the wagons being run together and are moved in the direction of the respective curved arrows, thereby raising the weights W, and as soon as the ends of the hooks A are clear of each other the action of the weights W cause the hooks to return to their normal position and automatically engage with each other, thereby effectually coupling the wagons without the aid of an attendant.

In order to uncouple the wagons, the buffers are brought together, and on raising the bell-crank lever H at X the link F and rod G are operated, causing the draw-bar hook A to move in the direction of the before-mentioned curved arrow clear of the other draw-bar hook, thereby uncoupling the wagons.

What I claim as my invention is—

In combination in a car-coupling, the jaws B, B, the hooks pivoted thereto to move horizontally, said hooks having their hooked ends extending vertically from their shank portions and inclined in relation to each other whereby they may slide past each other when contacting and the weighted lever connections to the pivoted hooks for controlling the same.

In testimony whereof I have signed my name to this specification in the presence of two subscribing witnesses.

ARTHUR RUSHFORTH.

Witnesses:
 WM. PREST,
 JOSEPH KIRBY.